(12) United States Patent
Sutcliffe et al.

(10) Patent No.: US 6,249,282 B1
(45) Date of Patent: *Jun. 19, 2001

(54) METHOD AND APPARATUS FOR MATCHING REGISTERED PROFILES

(75) Inventors: Andrew B Sutcliffe, Tyngsboro; Kevin A. Dunn, Boston, both of MA (US)

(73) Assignee: Tele-Publishing, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/479,482

(22) Filed: Jan. 10, 2000

Related U.S. Application Data

(63) Continuation of application No. 08/874,564, filed on Jun. 13, 1997, now Pat. No. 6,052,122.

(51) Int. Cl.[7] ................................................ G06F 3/00
(52) U.S. Cl. ............................ 345/331; 345/329; 707/6; 709/203
(58) Field of Search ............................ 345/331, 329, 345/339; 707/3, 6, 102, 501, 203

(56) References Cited

U.S. PATENT DOCUMENTS

| | | |
|---|---|---|
| Re. 30,579 | 4/1981 | Goldman et al. . |
| Re. 30,580 | 4/1981 | Goldman et al. . |
| 4,348,744 * | 9/1982 | White ................................ 709/253 |
| 4,608,601 | 8/1986 | Schreck et al. . |
| 4,651,150 | 3/1987 | Katz et al. . |
| 4,739,322 | 4/1988 | Katz et al. . |
| 4,792,968 | 12/1988 | Katz . |
| 4,816,824 | 3/1989 | Katz et al. . |
| 4,845,739 | 7/1989 | Katz . |
| 4,870,579 | 9/1989 | Hey . |
| 4,930,150 | 5/1990 | Katz . |
| 4,932,046 | 6/1990 | Katz et al. . |
| 4,939,773 | 7/1990 | Katz . |
| 4,987,590 | 1/1991 | Katz . |
| 4,996,642 | 2/1991 | Hey . |
| 5,014,298 | 5/1991 | Katz . |
| 5,016,270 | 5/1991 | Katz . |
| 5,048,075 | 9/1991 | Katz . |
| 5,073,929 | 12/1991 | Katz . |
| 5,086,394 | 2/1992 | Shapira . |
| 5,091,933 | 2/1992 | Katz . |
| 5,109,404 | 4/1992 | Katz et al. . |
| 5,128,984 | 7/1992 | Katz . |
| 5,136,501 | 8/1992 | Silverman et al. . |
| 5,185,787 | 2/1993 | Katz . |
| 5,218,535 | 6/1993 | Pietrowski . |

(List continued on next page.)

OTHER PUBLICATIONS

Nexpo 96; "Match.com Electric Classfields" Jul. 29, 1996.*
"WWW.match.com, Online Matchmaking", web site pages, 4 pages, printed out on Jun. 16, 1997 (origination date unknown).

Primary Examiner—Raymond J. Bayerl
Assistant Examiner—Thomas T. Nguyen
(74) Attorney, Agent, or Firm—Nutter, McClennen & Fish LLP

(57) ABSTRACT

A system of matching a first user with at least one other user of the system by comparing criteria data of the first user with characteristic data of the at least one other user and criteria data of the at least one other user with characteristic data of the first user. The characteristic and criteria data can be obtained via the Internet, and more specifically through a series of web site screens that prompt the user for characteristic and preference data. The system performs the comparison of the respective characteristic and criteria data to provide a list of matches to the first user. The first user is furnished with information that allows the first user to contact the other users for which a match has been found.

41 Claims, 7 Drawing Sheets

U.S. PATENT DOCUMENTS

| | | |
|---|---|---|
| 5,218,631 | 6/1993 | Katz . |
| 5,224,153 | 6/1993 | Katz . |
| 5,251,252 | 10/1993 | Katz . |
| 5,255,309 | 10/1993 | Katz . |
| 5,259,023 | 11/1993 | Katz . |
| 5,297,197 | 3/1994 | Katz . |
| 5,347,306 | 9/1994 | Nitta . |
| 5,349,633 | 9/1994 | Katz . |
| 5,351,285 | 9/1994 | Katz . |
| 5,359,645 | 10/1994 | Katz . |
| 5,365,575 | 11/1994 | Katz . |
| 5,412,708 | 5/1995 | Katz . |
| 5,442,688 | 8/1995 | Katz . |
| 5,491,743 | 2/1996 | Shiio et al. . |
| 5,495,284 | 2/1996 | Katz . |
| 5,496,175 | 3/1996 | Oyama et al. . |
| 5,551,880 | 9/1996 | Bonnsletter . |
| 5,553,120 | 9/1996 | Katz . |
| 5,561,707 | 10/1996 | Katz . |
| 5,568,540 | 10/1996 | Greco et al. . |
| 5,623,660 | * 4/1997 | Josephson ............... 707/9 |
| 5,653,065 | * 8/1997 | McIlwain ............... 52/65 |
| 5,681,046 | 10/1997 | Lawrence . |
| 5,696,981 | 12/1997 | Shovers . |
| 5,775,695 | * 7/1998 | Byers ............... 273/161 |
| 5,794,210 | 8/1998 | Goldhaber et al. . |
| 5,796,393 | 8/1998 | MacNaughton et al. . |
| 5,796,395 | * 8/1998 | Hond ............... 345/331 |
| 5,796,945 | 8/1998 | Tarabella . |
| 5,835,087 | 10/1998 | Herz et al. . |
| 5,878,416 | 3/1999 | Harris et al. . |
| 5,884,272 | * 3/1999 | Walker et al. ............... 705/1 |
| 5,920,845 | * 7/1999 | Risemberg ............... 705/1 |
| 5,950,200 | * 9/1999 | Sudai et al. ............... 707/9 |
| 6,012,046 | * 1/2000 | Luplen et al. ............... 705/37 |

\* cited by examiner

~~Personal~~ Registration

GENDER AND RELATIONSHIP

I AM A: MALE ⟋—50
FEMALE

SEEKING A: (SELECT ANY AND ALL COMBINATIONS THAT APPLY)

FEMALE FOR A:
☐ RELATIONSHIP
☐ FRIEND
☐ EMAIL PEN PAL
☐ SPORTS OR ACTIVITY PARTNER

MALE FOR A:
☐ RELATIONSHIP
☐ FRIEND
☐ EMAIL PEN PAL
☐ SPORTS OR ACTIVITY PARTNER

⎫
⎬—52
⎭

AGE / BIRTHDATE

ENTER YOUR BIRTHDAY IN THE FORM OF MM/DD/YY ⟋—54
☐ / ☐ / ☐ —54A

WHAT IS THE AGE RANGE OF YOUR DESIRED MATCH? (FOR EXAMPLE, 35 TO 50, 22 TO 27, ETC.)

ETHNICITY — 56

I'D LIKE TO MEET SOMEONE WHO IS:

- NO PREFERENCE
  AFRICAN-AMERICAN
  ASIAN — 56A
  CAUCASIAN
  HISPANIC

MY RACE IS:

- I PREFER NOT TO ANSWER
  AFRICAN-AMERICAN
  ASIAN
  CAUCASIAN — 56B
  HISPANIC
  OTHER

---

BODY TYPE

I AM: — 58A

☐ FEET, ☐ INCHES TALL.
OR...
☐ CENTIMETERS

I WOULD LIKE TO MEET SOMEONE BETWEEN

☐ FEET ☐ INCHES AND ☐ FEET ☐ INCHES TALL.
OR... — 58B
BETWEEN ☐ AND ☐ CM TALL.

---

MY BODY TYPE IS: — 58C        AND I'M LOOKING FOR SOMEONE WHO IS:

- I PREFER NOT TO ANSWER        • NO PREFERENCE
  SLIM OR SLENDER                 SLIM OR SLENDER
  ATHLETIC                        ATHLETIC — 58D
  AVERAGE                         AVERAGE
  A FEW POUNDS OVERWEIGHT         A FEW POUNDS OVERWEIGHT
  OVERWEIGHT                      OVERWEIGHT

FIG. 2B

METHOD AND APPARATUS FOR MATCHING REGISTERED PROFILES

CROSS REFERENCE TO RELATED APPLICATION

This is a continuation of application Ser. No. 08/874,564 filed Jun. 13, 1997, now U.S. Pat. No. 6,052,122.

APPENDIX

This application includes a computer program appendix

STATEMENT REGARDING FEDERALLY SPONSORED RESEARCH

Not Applicable.

FIELD OF THE INVENTION

The present invention relates generally to matching, and more particularly to a system matching one user to at least one other user based on characteristics and preferences of the users.

BACKGROUND OF THE INVENTION

It is sometimes difficult for an individual to meet other individuals having similar interests and personal characteristics. There are many reasons for this difficulty such as long work hours, limited organizational memberships in the form of churches and the like, and unusual preferences to name but a few. For example, a person who has recently moved to a new area will likely not know many other people and thus may have limited social opportunities. Such a person may be introduced to many new people, but common interests or desirable and undesirable characteristics may not be readily apparent. Thus, a person may be able to reliably estimate the age of another, but not educational level or other such characteristics that may be of interest. Further, a person may want to enter a relationship only with a person having a similar religious affiliation. However, religious affiliation is not discernible from appearance alone. It will be appreciated that meeting others having characteristics that are important to a particular individual may not occur without significant effort and personal contact on the part of the individual.

In an attempt to meet the need for facilitating social interaction, many personal advertisement systems are available. They can be in the form of personal advertisements placed in a newspaper, magazine or other publication. Such personal ads allow an individual to specify limited criteria desired in another such as gender or race and the like, in addition to a minimal amount of text. Although such ads allow communication with many people in the form of readers, it will be appreciated that it can be difficult to tactfully set forth prerequisite requirements for another in the space typically allotted for such an ad.

After placement of a personal ad, the individual must wait for others to respond and may have very little, if any, information about them. Respondents may meet at least some of the criteria of the advertiser, but the advertiser may not have many of the characteristics desired by the respondent. This can decrease the chances of forming a desired ongoing relationship, friendship, or other form of association. In addition, much time can be spent and frustration experienced due to this lack of information.

As the popularity of the Internet has increased, some newspapers and other print publications now provide personal advertisements on various web sites. One such example is an on-line personal advertisement system having a plurality of users. Each user selects a set of criteria, such as height, body type, and interests, that must be met by another user. Upon request of a user, the system searches the database for other users that meet the criteria of the requesting user. In this way, a list of potential candidates is provided that the user may have an interest in contacting to begin a relationship or engage in activities of mutual interest.

Such a system provides an improvement over reading countless personal advertisements of which most will not be of any interest, but does not take into account the requirements of the candidates with respect to the first user. For example, a first candidate may meet all the requirements of the first user, but the first user may not meet any of the criteria of the first candidate. Thus, the first user may contact candidates that are not interested in meeting the first user because the first user does not meet some requirement of a respective candidate.

Another disadvantage of such a system is that the candidates meeting the criteria of example, the first user may feel that the most important characteristic of a candidate be that the candidate not drink. A candidate may likewise feel strongly about drinking, but be only one of many candidates that meet the first user's criteria. Presenting candidates that meet the criteria specified by the first user in an ordered manner would be useful.

SUMMARY OF THE INVENTION

The present invention provides a system for matching a first user with at least a second user based on criteria and characteristics of the both the first user and the at least a second user. The system includes a user interface means, such as a graphical user interface, to obtain characteristic and criteria data for users of the system. Characteristic data generally describes a user and criteria data sets forth desired characteristic data for another user. For example, for the first user a characteristic data element with respect to drinking may be that the first user does not drink at all, whereas the corresponding criteria data element for the first user can be that the first user prefers someone who drinks socially. The system further includes memory means for storing the characteristic and criteria data of users of the system. Comparison means are provided to compare the criteria data of the first user with the characteristic data of the at least one other user and to compare the criteria data of the at least one other user with the characteristic data of the first user. For the case where the characteristic data of the at least one other user meets the criteria data of the first user and the characteristic data of the first user meets the criteria data of the at least one other user, communication means provide information associated with the at least one other user to the first user. The system can include ordering means for ordering search results based on one or more parameters.

In a first embodiment, a graphical user interface in the form of web site screens prompt users for the characteristic and criteria data that is stored in the form of data strings in a database. A plurality of tables contain various user information. A data string used to search the database is formed based on the characteristic and criteria data provided by the first user and the at least one other user. The data string requires that the characteristic data of the at least one other user meets the criteria data of the first user and that the characteristic data of the first user meet the criteria data of the at least one other user. The search results, i.e., matches, are provided to the first user in the form of information associated with at least one other user so that the first user may contact the matched at least one other user. The results can be ordered based on a parameter, criteria priorities, criteria and/or characteristic weighting or other means.

In accordance with a further aspect of the invention, a computer implemented method of matching a first user with at least one other user of a system includes obtaining and storing characteristic and criteria data from users of the system. The system compares the criteria data of the first user with criteria data of at least one other user and compares the criteria data of the at least one other user with the characteristic data of the first user. In the case where the characteristic data of the at least one other user meets the criteria data of the first user and the characteristic data of the first user meets the criteria data of the at least one other user, a match is found. Match data are provided to the first user in the form of information that allows the first user to establish contact with the at least one other user. Search results can optionally be provided in an order based on a parameter, priority of criteria and/or characteristics, criteria and/or characteristic weighting, or other means.

BRIEF DESCRIPTION OF THE DRAWINGS

The foregoing features of this invention as well as the invention itself may be more fully understood from the following detailed description of the drawings, in which:

FIGS. 2A–B are exemplary graphical user interface pages in the form of web screens for obtaining information from the first user and at least one other user of FIG. 1;

DETAILED DESCRIPTION OF THE INVENTION

The present invention is described in conjunction with an on-line personal advertisement system that provides to a first user information associated with at least one other user of the system based on characteristic and criteria data of the first user and the at least one other user. However, the present invention is useful in many applications for matching individuals and items using a wide variety of characteristic and criteria data. Accordingly, the invention is not to be limited to the particular context, application or embodiments described herein.

In the on-line personal advertisement system described herein, reference is made to characteristic and criteria data. As used herein, characteristic data refers to information that describes a user. For example, characteristic data elements associated with the first user refer to the gender of the first user, the drinking habits of the first user, and other such information. Criteria data refers to the characteristics preferred in another user by the first user. For example, the criteria data of the first user can include a requirement that another user be a specified gender or that another user have certain drinking patterns. Thus, characteristic data refers to the first user and criteria data refers to the preferences of the first user with respect to another user.

The on-line personal advertisement system can provide personal ads having several components such as profile data in the form of characteristic and criteria data, a voice greeting, and a textual portion provided by the user. In addition, each user can have a personal journal that includes, for example, a list of other users that the user has selected, the last e-mail sent and received for a particular user, and search results as described in conjunction with FIGS. 3A–B. Thus, a user may choose a particular means to contact another user, such as by e-mail, leaving a voice message, or other means. In one embodiment, a user can purchase "stamps" to enable e-mail or other user contact. An exemplary personal advertisement system and aspects thereof are described in further detail in other applications assigned to the Assignee of the present application and filed on even date herewith entitled: "Interactive Personals Online Network Method and Apparatus" (U.S. Pat. No. 6,073,105), "Personal Journal" (U.S. Pat. No. 5,913,212), and all herein incorporated by reference.

Figure 1:
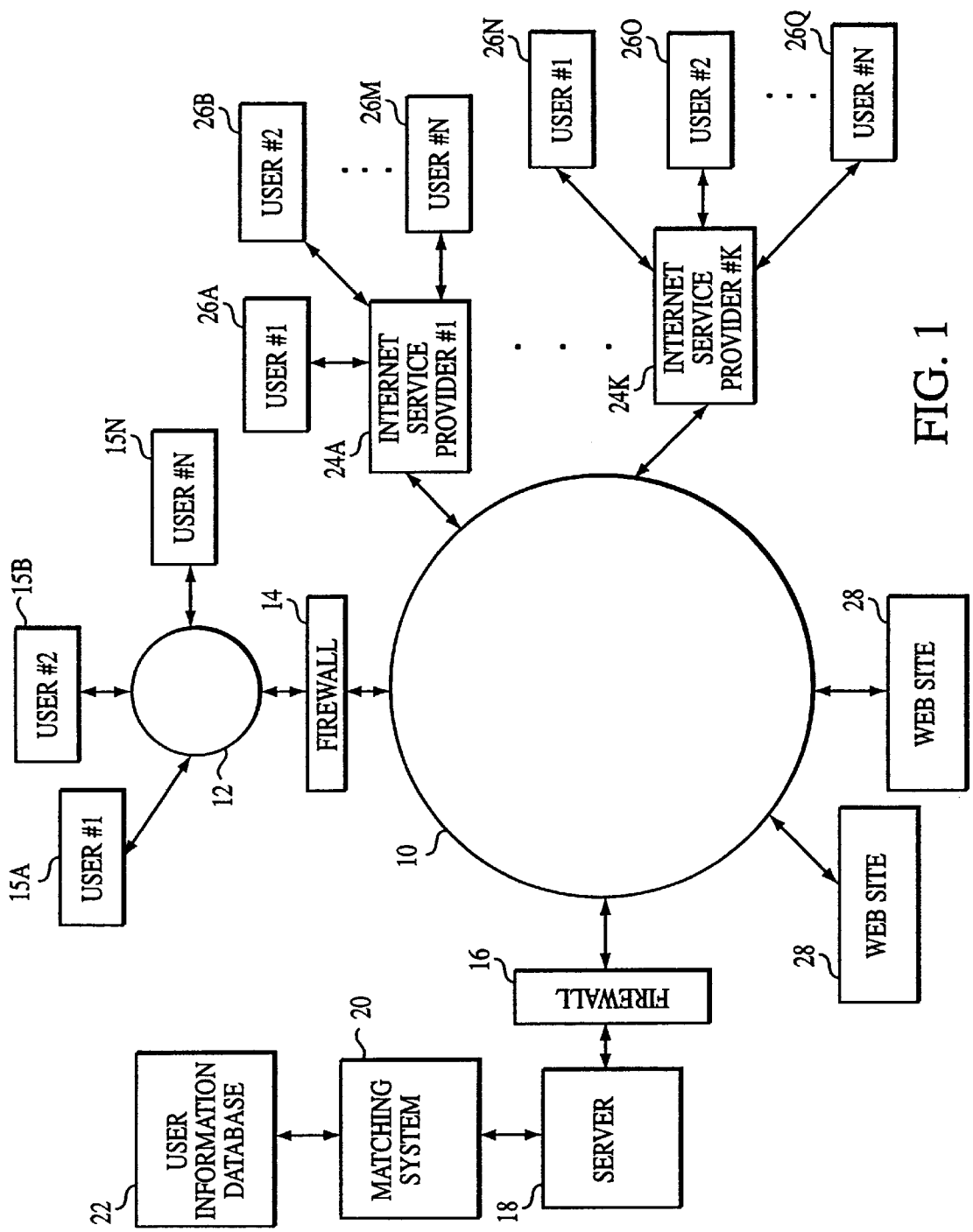
FIG. 1 is a block diagram of a system for matching a first user with at least one other user of the system in accordance with the present invention.

As shown in FIG. 1, a system for matching a first user to at least one other user can be implemented using communication over the Internet. Referring to FIG. 1, a public network or Internet 10 is coupled to a private network 12 through a firewall server 14. Coupled to private network 12 are a plurality of users 15a–15N generally denoted 15. As used herein, the term "Internet" generally refers to any collection of distinct networks working together to appear as a single network to a user. The term "Internet", on the other hand, refers to the so-called world wide "network of networks" that are connected to each other using the Internet protocol (IP) and other similar protocols. The Internet provides file transfer, remote log in, electronic mail, news and other services.

As described herein, the exemplary public network of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 1. For example and without limitation thereto, the system of the present invention can find application in public as well as private networks, such as university roommate matching, company job listings and transfer opportunities.

The firewall server 14 is a computer which couples the computers of a private network or server e.g. network 12 to the Internet 10. Firewall server 14 may thus act as a gatekeeper for messages and data grams going to and from the Internet 10.

Also coupled to Internet 10 through a second firewall server 16 is a server 18. Server 18 has coupled thereto a matching system 20 and a user information database 22. Server 18 allows properly authorized users to access matching system 20. The function of matching system 20 will be described in detail herein below. Suffice it here to say, however, that matching system 20 matches a first user with at least one other user based on characteristic and criteria data of the users.

An Internet service provider 24 is also coupled to the Internet 10. A service provider is an organization that provides connections to a part of the Internet. Internet service provider 24 includes a processor which couples a plurality of users 26a–26M to the Internet 10. Thus, users 26a–26M are coupled to the Internet through Internet service provider 26.

Also coupled to the Internet 10 are a plurality of web sites or nodes 28. When one of the users 15, 26 wishes to conduct a transaction at one of the nodes 28, the user 15, 26 accesses the node 28 through the Internet 10.

Each node in the system shown in FIG. 1 is configured to understand which firewall and node to send data packets to given a destination IP address. This may be implemented by providing the firewalls and nodes with a map of all valid IP addresses disposed on its particular private network or another location on the Internet 10. The map may be in the form of prefix matches up to and including the full IP address.

User information can be stored in database 22. The information need only be stored once. The information may be stored, for example, as a record or as a file. The information for each particular user is stored in a particular data structure in database 22.

Database 22 and matching system 20 may be provided, for example, as a database management system (DBMS), an object-oriented database management system (ODBMS), a relational database management system (e.g. DB2, ACCESS etc.) or another conventional database package. Thus, the database 22 can be implemented using object-oriented technology or via text files. Further, the database 22 can be accessed via a Structured Query Language (SQL) or other tools known to one of ordinary skill in the art.

FIGS. 2A–B are exemplary screens provided to a user, such as over the Internet, to obtain user characteristic and criteria data from users of the system. As shown in FIG. 2A, the user provides gender data via gender selection area 50. The user also identifies the gender and type of relationship that is desired in relationship selection area 52. The listed choices shown represent one embodiment with many other choices also being possible without departing from the scope of the invention. Similarly for other characteristic and criteria data elements which are not to be limited to the particular embodiments shown and described herein. Further, more and fewer characteristic data and criteria data elements, having more and less choices are possible. In age information area 54, the user provides age characteristic data 54a and age criteria data 54b in the form of a range of ages. In ethnicity information area 56, the user provides ethnicity characteristic data at user ethnicity area 56a, and ethnicity criteria data at preferred ethnicity area 56b. The user provides body type characteristic data in the form of height in height area 58a, and body type characteristic data in body type area 58c. The user provides body type criteria data in the form of height range in preferred height area 58b and preferred body type information in body type area 58d. In an exemplary embodiment, a user selects body type characteristic and criteria data from listed possibilities, such as slim, athletic, average, a few pounds overweight, and overweight. It will be appreciated that more and fewer choices, using different terms can be used. Also, for each of the data elements the user selects from the listed choices that are appropriate for the particular data. For example, smoking and drinking characteristic and criteria data provide choices such as no preference, never, occasionally and regularly. For educational level, a user may choose from no preference or prefer not to answer, high school, some college, completed college, and post-college. In an illustrative embodiment, the user can specify that another user has completed at least one of the listed levels of education.

As can be seen, the user can choose not to provide certain characteristics by responding "I prefer not to answer". Similarly, the user can decline to express a preference for certain criteria data by responding "No preference". The corresponding characteristic or criteria data element is then treated accordingly as described in conjunction with the process steps associated with forming a search string. Suffice it to say that a no preference response will not limit the search for other users for the particular element.

In an exemplary embodiment, the obtained characteristic and criteria data are stored in first and second tables, wherein a row is provided for each user of the system. In one embodiment, the first or "seeking" table, Table I below, stores data that in an illustrative embodiment must be provided in order to do a search. This data are the gender and type of association that is desired in another user and is selected as shown in gender and relationship selection areas 50 and 52 (FIG. 2A). The system uses this information to match one user to another. For example a male seeking a female for a friend will be matched to a female seeking a male for a friend.

TABLE I

| FIELD | DESCRIPTION |
| --- | --- |
| USER_ID | Handle |
| SEEK_GENER | Gender sought by user |
| SEEK_FOR | Type of association sought by user |

The second or "user" table, Table II below, is an illustrative embodiment of a table storing data associated with a user including exemplary characteristic and criteria data obtained through screens as typified by FIGS. 2A–B.

TABLE II

| FIELD | DESCRIPTION |
| --- | --- |
| USER_ID | Handle |
| SEQ_ID | sequential ID |
| CLIENT_ID | identifies client newspaper |
| BOX_NO | mailbox from audiotext system to record greeting |
| INTERNET | user sign up from Internet? |
| FLAGS | i.e., send automatch mailings? |
| PRIV_PW | login password |
| VRFY_PASSWD | verify email addresses reply mail |
| VERIFIED | has email address been verified? |
| PERSONAL_TEMP | template code for personal page being edited |
| PERSONAL_PG | template code of personal page |
| STAMPS | number of stamps that have been paid for |
| CREATED | date user created |
| LAST_ACT | last login date |
| MATCHED | date user was last matched |
| FNAME | first name |
| LNAME | last name |
| ADDR_A | first address |
| ADDR_B | second address |
| CITY | city |
| STATE | state |
| ZIP | zip code |
| COUNTRY | country |
| AREACODE | area code |
| PHONENUMBER | phone number |
| GET_MAILINGS | get mailings? |
| EMAIL | email address |
| HEADLINE | headline of personal ad |
| BODY | body of ad |
| EXPIRES | date web ad expires |
| STATUS | approved, unapproved, or rejected |
| SEX | gender |
| BIRTHDAY | date of birth |
| ETHNO | ethnicity |
| RELIGION | religion |
| CHILDREN | parental status |
| SMOKING | smoking status |
| DRINKING | drinking status |
| BODY_TYPE | type of body |
| EDUCATION | educational background |
| HEIGHT | height |
| AGE | age |
| LOCATION | location |

TABLE II-continued

| FIELD | DESCRIPTION |
|---|---|
| LATITUDE | geographic latitude |
| LONGITUDE | geographic longitude |
| ETHNO_PREF | preferred ethnicity |
| RELIGION_PREF | preferred religious affiliation |
| CHILDREN_PREF | preferred parental status |
| SMOKING_PREF | preferred smoking status |
| DRINKING_PREF | preferred drinking status |
| BODY_TYPE_PREF | preferred body type |
| EDUCATION_PREF | preferred educational level |
| HEIGHT_MIN | preferred minimum height |
| HEIGHT_MAX | preferred maximum height |
| AGE_MIN | preferred minimum age |
| AGE_MAX | preferred maximum age |
| LOCATION_PREF | preferred geographical location |
| HAS_PROFILE | have a profile? |
| HAS_GREETING | have a greeting? |
| HAS_REMOTE_GREETING | have an audiotext greeting? |

Tables I and II are exemplary embodiments and the invention is not to be limited thereto. More and less criteria and characteristic data elements can be used. For example, a user can interactively take a psychological test, such as enneagrams and Briggs-Meyers, that yield discrete results. A user can take the test and have the option to have the results added as a characteristic data element and as a criteria element. Thus the user and another user would be matched for similar test results. Also, the user may choose not to provide certain characteristic data and may decline to specify a preference with respect to one or more of the criteria data elements.

Figure 3A:
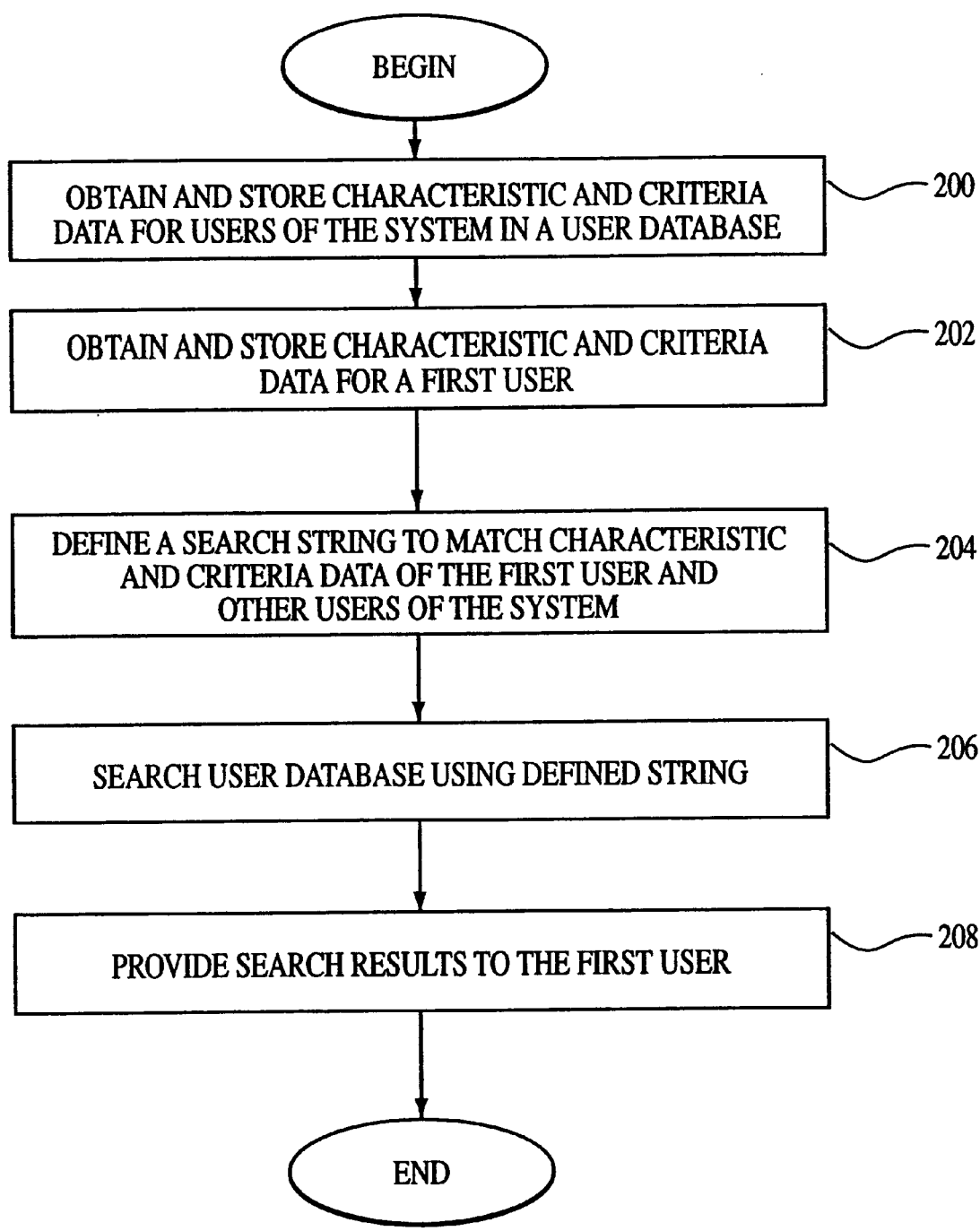
FIGS. 3A–B are flow diagrams illustrating an exemplary set of processing steps for matching a first user to at least one other user in accordance with the present invention.
Figure 3B:
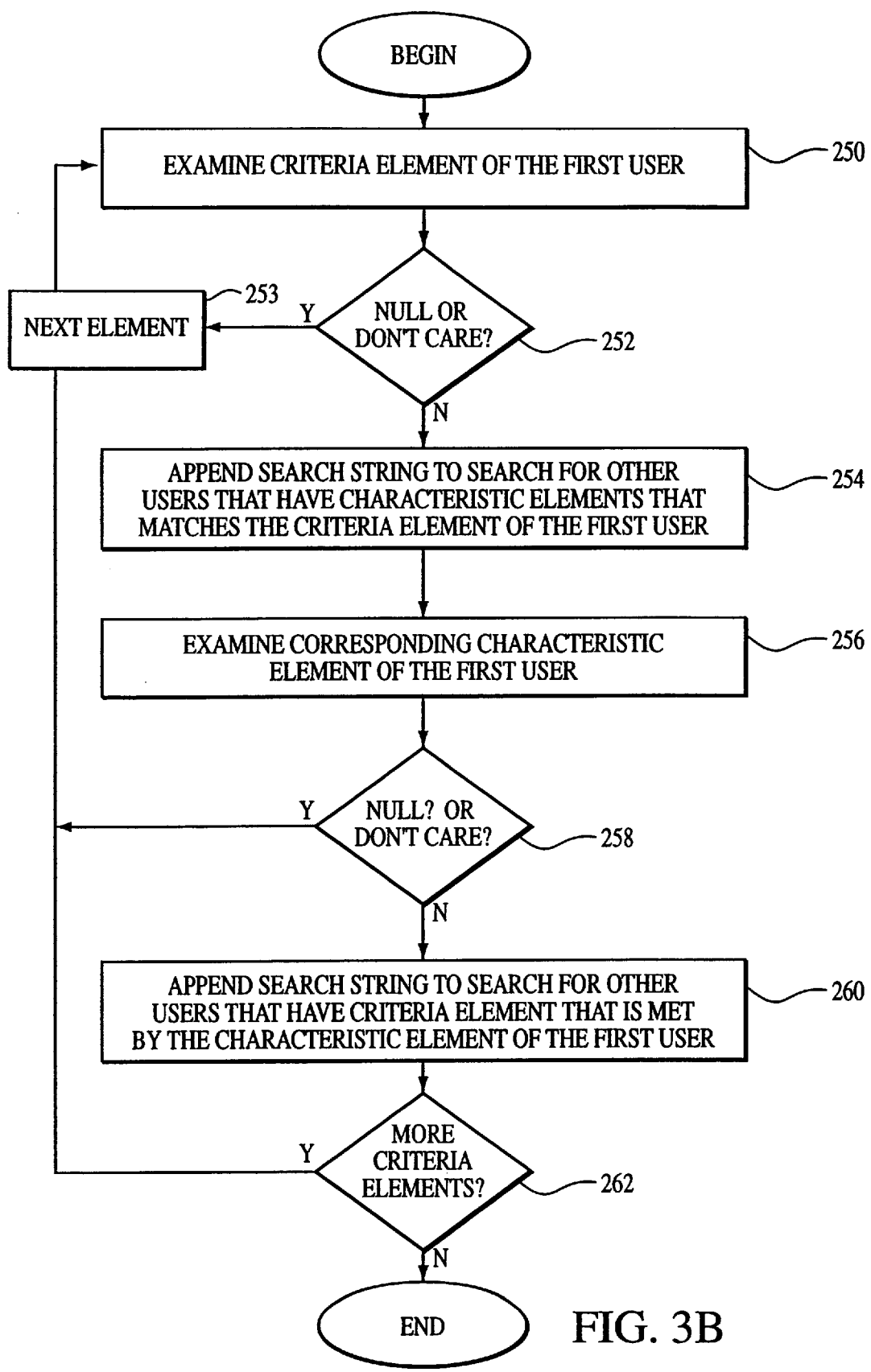

FIGS. 3A–B are a series of flow diagrams showing the processing performed by matching system 20 (FIG. 1) to generate a match list in response to a user request. The rectangular elements (typified by element 200 in FIG. 3A), herein denoted as "processing blocks," represent computer software instructions or groups of instructions. The diamond shaped elements (typified by element 252 in FIG. 3B), herein denoted as "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Referring to FIGS. 3A and 3B, the system obtains and stores the characteristic and criteria data for users of the system in step 200, and for a first user in step 202, as described above in conjunction with FIGS. 2A–B. A first user can request a search of the database for other users based on characteristic and criteria data. In another embodiment, the system can periodically examine the database to search for users for which there is a bidirectional match of characteristic and criteria data. A search string is formed in step 204 to match the first user criteria data with the characteristic data of other users and the first user characteristic data with the criteria data of the other users. The formation of the search string is discussed in further detail in FIG. 3B. After forming the search string, the database is searched using the string to obtain a list of matches in step 206. In optional step 208, the search results in the form of matches are provided to the first user. A user that has been matched with the first user can be notified that a match for that user has been found. It will be appreciated that search strings can be formed to examine the user database for statistical or marketing purposes, as well as for user searching.

FIG. 3B shows details associated with step 204 of FIG. 3A in defining the search string. In an exemplary embodiment, in order to query the user database, a search string is formed that includes the relevant search criteria to search the database. In step 250, a particular criteria element of the first user is examined, preferred body type for example.

This criteria element is checked in step 252 to determine if the element is null or don't care. A don't care corresponds to a user response of "No preference" and a null corresponds to no answer at all, although there is no difference between them with respect to processing. If the particular criteria element is null or don't care, than the search string does not need to be modified and the next element is selected for examination in step 253. If the user has provided a preference for the criteria element then the search string is appended in step 254 to include the selected criteria. More specifically, the search string is appended to require that the corresponding characteristic data element of the respective other user in the database match the particular criteria data element of the first user. In step 256, the corresponding characteristic data element of the first user is examined and in step 258 a determination is made to see if the element is null or don't care. If it is, then the search string does not need to be modified and the next criteria element of the first user is selected in step 253. If the element is not null or don't care, the search string is appended in step 260 to require that the particular criteria data element of the respective other user match the corresponding characteristic data element of the first user or that the respective other user criteria data element is null, i.e., no preference. In step 262, a determination is made as to whether there are more criteria elements to be compared. If there are, then the next element is selected in step 253. In a further embodiment, a determination is made to see if the first user has specified one or more keywords to be searched for in text associated with a personal ad of another user. If one or more keywords has been specified, then the search string is modified to require that the one or more search word be found. After the search string has been formed, the user database is searched in step 206 (FIG. 3A) using the formed search string.

In one embodiment, a match represents a match of each of the specified criteria elements of the first user and the at least one other user. More specifically, each of the criteria data elements that have been specified by the users is met by the respective other user. Response in the form of no preferences would not prevent a match from occurring. In a further embodiment, a match can represent a match of less than all of the criteria elements. For example, all the criteria elements of first user are met by the characteristic data of another user except for one element. Thus, a close match can be made and communicated as such to the first user. In one embodiment, inexact matches are provided in the case where no exact matches are found, or some limited number. For example, the criteria data elements can be removed in a predetermined order. In an illustrative embodiment, where no or few exact matches result, first religion criteria of the first and/or second user can be ignored, and the search repeated. The order can be specified by the first and/or second user, or the client interactively or otherwise.

In a further embodiment of the invention, the results of a search are ordered in relation to a parameter. It will be appreciated that particular examples provided herein are illustrative and are not intended to limit the invention thereto. In one embodiment, the results are ordered based in order form most to least important: whether a user has email, whether a user has a voice greeting, whether a user has a textual personal ad, and also by a system sequential ID number. A textual personal ad used herein is one component of an on-line personal advertisement system, where the possible components are user characteristic and criteria data (profile data), a personal ad having text entered by a user, a voice greeting that a user has recorded, and a sequential identification that is assigned by the system.

In another embodiment, search results are ordered by examining the priority of particular criteria data elements assigned by users. For example, the user may assign a priority between one and ten inclusive to each criteria element wherein multiple elements can be assigned the same priority. In another embodiment, each of the criteria elements are assigned a priority from most to least important. Thus, for twenty criteria elements, the elements would be assigned a priority from one to twenty, with each element having a unique priority between one and twenty inclusive. The priority data assigned to each element can be included as part of a search string. In an illustrative embodiment, the search string can require that the first user and another user of FIG. 2B each be assigned the same priority, or within some range thereof. In another embodiment, the most important criteria element must be the same for the users, or within some range thereof. Further embodiments include ordering the search results based on e-mail capability, voice-greeting status, on-line personal ad status, system identification number, geographical closeness, closeness in age, astrological compatability, response level to personal ad, client, number of users in personal journal, likelihood of responding to an e-mail, most recent system interaction, and number of system stamps.

In a still further embodiment, the criteria and/or characteristic data can be weighted.

For example, the height criteria of the first user can be weighted to worth twice that of drinking. Each of the criteria data elements can be provided with a particular weight. In another embodiment, a user can select from a predetermined weighting scheme. In a further embodiment, the user can choose a weight to be assigned to each criteria data element. Thus, for each criteria data element that matches a corresponding characteristic data element of another user a number of points corresponding to the weight would be added to a running total. Each comparison of the first user and a respective other user would have a point total associated therewith. Some number of the highest point totals, ten or fifty for example, can be saved. The user information corresponding to the other users having the highest point totals is provided to the first user so that the first user can contact the respective other users.

In an alternative embodiment, "fuzzy" matching can be used for the case where ranges are given. For example, if a first user indicates a preference for an age range of 34–40, weights are assigned to all ages, where the ages within the range are heavily weighted while the weights associated with particular ages fall off as the distance from the selected range increases. In the prior example, ages from 34–40 would be heavily weighted, while 41 would be assigned a weight less than 40, 42 less than 41, and so on. This can continue until an exemplary age distance is reached, such as ten years, so that ages 50 and above would not be weighted or could be assigned a negative weight. In another modification, ranges can be relaxed in the case where there are none, or few matches. For example, for a preferred age range of 34–40 that results in no matches, the range can be increased to 32–42 and the search repeated. In the embodiments described herein, the system can interact with the first user to tailor a search in accordance with the first user's instructions. Thus, in the case where the age range is relaxed, the system can provide a sample ad that would be available for the relaxed age range. Such interaction can be used to modify other criteria data elements as well.

In a further embodiment, the system stores information for each user that indicates, for example, the number of emails sent and received, what types of people send emails to what other types of people based on one or more characteristic and/or criteria data, the number of times that a user is matched with another user, the number of times a user has been contacted and how many times that user responded. This information can be used as a criteria so that a user can indicate a preference for other users that generally respond to emails. This information can also be used to order search results so that a user that hasn't responded to the last five emails may be placed near the bottom of the search results.

In yet another embodiment, a system for matching in accordance with the present invention provides a personal advertisement service for a plurality of publications, such as newspapers or clients. A newspaper client may enlist the services of a vendor, such as Tele-Publishing, Inc., the Assignee of the present invention, to provide the matching system. In an illustrative embodiment, the system provides a personal advertisement service to a plurality of clients and each personal advertiser is assigned to particular client. The characteristic client information for a particular user can be stored in the CLIENT_ID of Table II. It will be appreciated that first and second clients that both operate within a particular geographic area, i.e., competing newspapers, can use the matching system. However, the first client may not wish to allow personal advertisers associated with the first client to be matched with personal advertisers associated with the second client. In one embodiment, the system does a search for a first user that prevents a match from resulting with a second user based on the client characteristic. Thus, although the first and second users may match each of the respective characteristic and client data elements, a match does not result in the case where the first user is associated with a first client that does not allow matches with other users associated with a second client. In another embodiment, a first client may require that only personal advertisers, or users, associated with the first client can be matched with other users. Thus, a search for a first user associated with a first client would only return matches of other users that are associated with the first client.

In a still further embodiment, match results are ordered based on a predefined order of clients. In other words, matches of other users associated with a first client are provided first, and other users associated with a second client are provided second, and so on.

In yet another embodiment, one or more clients have client specific categories associated therewith. In FIG. 2, the categories shown include a characteristic gender, preferred gender, and the four types of association, i.e., relationship, friend, email pen pal, and sports or activity partner. A client can also include further categories tailored to one or more clients. For example, a client having a publication directed to sports enthusiasts can include categories to search for a Christian man seeking Christian woman for outdoor sports. In order to find a match for a first user with a second user, the second user would have to be associated with the same or different client that has the same categories, and the category information would have to match. Of course for a match to result, characteristic and criteria data would also have to match. In one embodiment, a criteria search is not done unless the category information matches. Thus, a search can be limited to users that are associated with clients that have the same categories.

Figure 4:
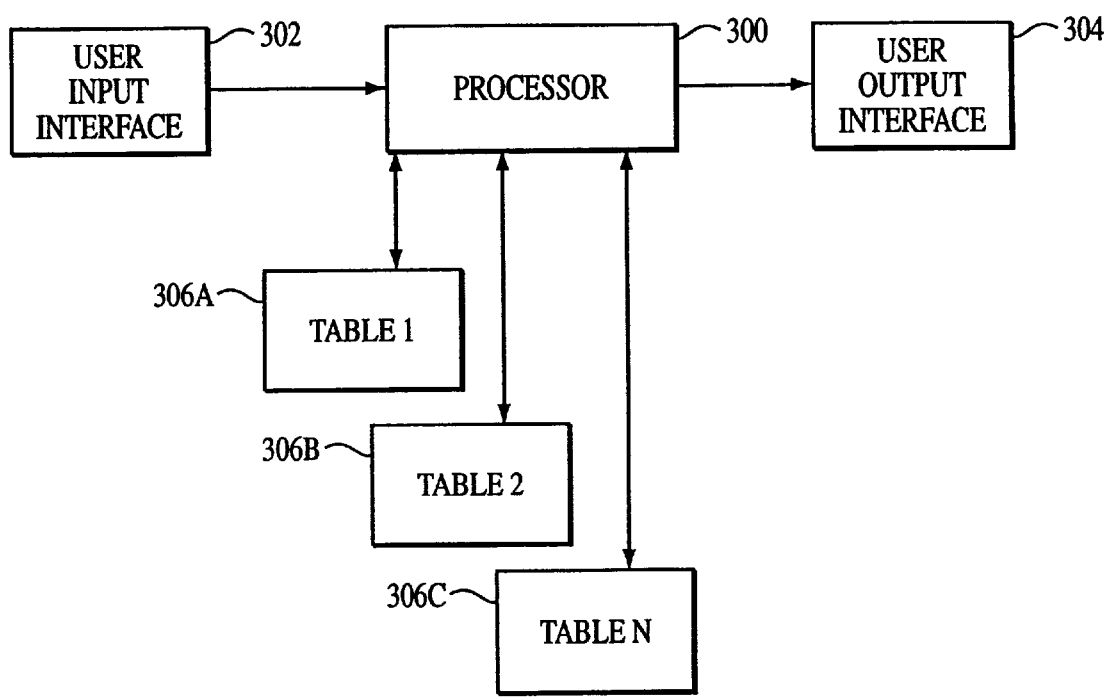
FIG. 4 is a block diagram of the matching system of FIG. 1.

Referring now to FIG. 4, a matching system in accordance with the present invention includes a processor 300 coupled to a user input data interface 302 and a user output data interface 304. User input and output interface 302,304 can be a graphical user interface (GUI) or other suitable means for data transfer. Processor 300 can be a programmable device that implements the processing steps described in conjunction with FIGS. 2A–B.

Processor 300 is coupled to a plurality of tables 306a–306n generally denoted 306. Each of the tables includes information associated with users of the system. In an exemplary embodiment, a plurality of tables include various user information as discussed above with respect to Tables I and II. Table I contains the preferred gender and type of relationship desired (i.e., relationship, friendship, activity partner, e-mail) by the users. In an exemplary embodiment, this information is required to do a search for a match. Table II contains the characteristic and criteria data for users of the system.

Figure 5:
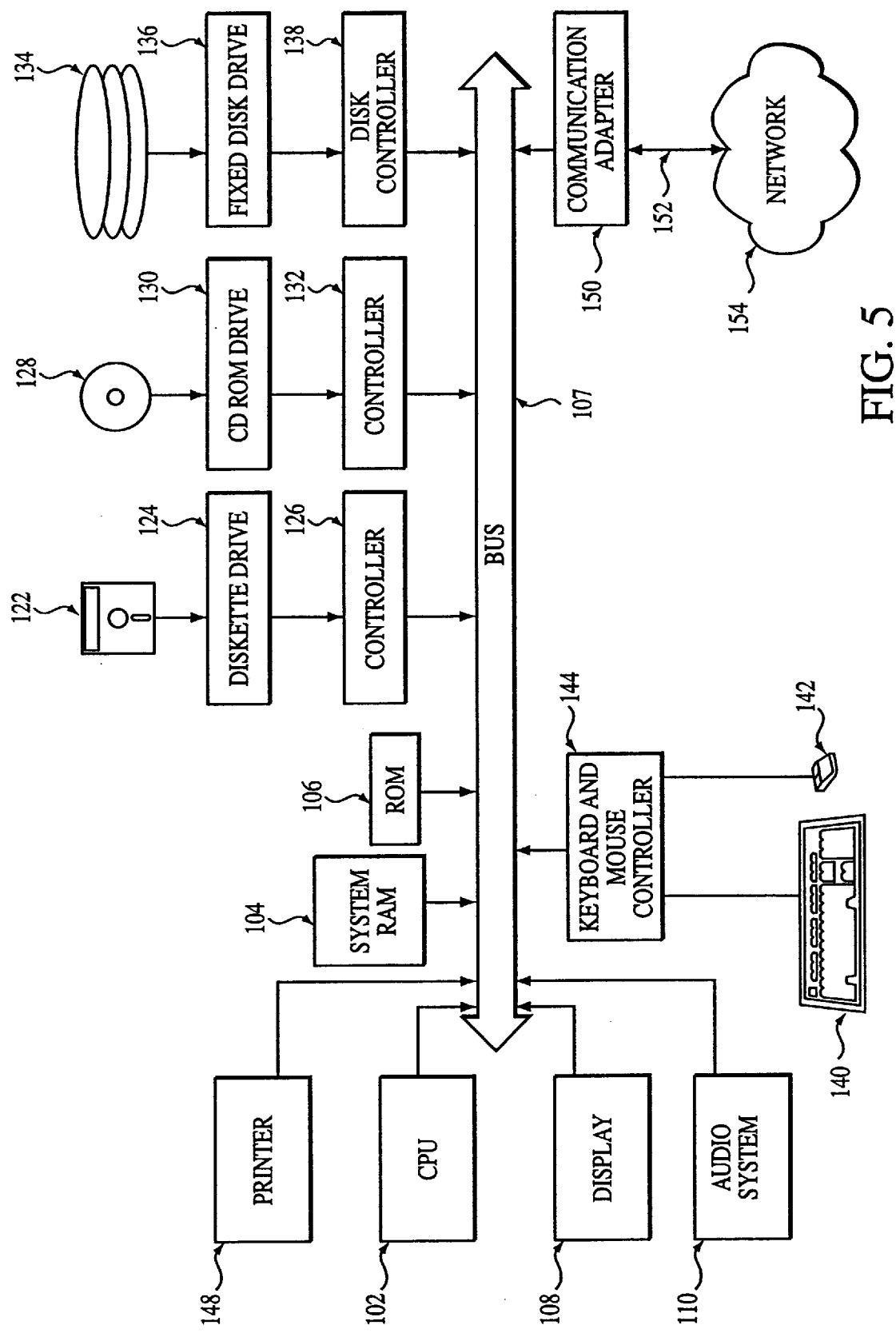
FIG. 5 is a block diagram of a computer system adapted for use with the matching system of FIG. 1.

Referring now to FIG. 5, a computer system 100 on which the invention may be implemented is shown. Computer system 100 may be provided, for example, as an IBM compatible computer or any other equivalent computer system. The exemplary computer system 100 of FIG. 5 is for descriptive purposes only. Although the description may refer to terms commonly used in describing particular computer systems, the description and concepts equally apply to other processing systems, including systems having architectures dissimilar to that shown in FIG. 5.

Computer system 100 includes a central processing unit (CPU) 102, which may be provided, for example, as a conventional microprocessor, a random access memory (RAM) 104 for temporary storage of information, and a read only memory (ROM) 106 for permanent storage of information. Computer system 100 also includes a display 108, and an audio system 110. Each of the aforementioned components are coupled to a bus 120. Operation of computer system 100 is generally controlled and coordinated by operating system software. The operating system controls allocation of system resources and performs tasks such as processing, scheduling, memory management, networking, and I/O services, among things. Thus, an operating system resident in system memory and executed by CPU 102 coordinates the operation of the other elements of computer system 100.

Also coupled to bus 120 is a non-volatile mass storage device which may be provided as a diskette 122. Diskette 122 is insertable into a diskette drive 124 which is, in turn, coupled to bus 120 by a controller 126. Similarly, a compact disc (CD) ROM 128 is insertable into a CD ROM drive 130 which is, in turn, coupled to bus 120 by a controller 128. A hard disk 134 is typically provided as part of a fixed disk drive 136 which is coupled to bus 120 by a disk controller 138.

Data and software may be provided to and extracted from computer system 100 via removable storage media such as diskette 122 and CD ROM 128. For example, data values generated may be stored on storage media similar to media 122, 128. The data values may then be retrieved from the media 122, 128 by CPU 102 and utilized by CPU 102 to perform the processing steps described herein. Alternatively, CPU 102 may simply store such data values in ROM 106.

Alternatively still, computer software useful for matching may be stored on storage media similar to media 122, 128. Such computer software may be retrieved from media 122, 128 for immediate execution by CPU 102 or by other processors included in one or more peripherals of computer system 100 such as display 108, or audio system 110. CPU 102 may retrieve the computer software and subsequently store the software in RAM 104 or ROM 106 for later execution. User input to computer system 100 may be provided by a number of devices. For example, a keyboard 140 and a mouse 142 are coupled to bus 120 by a controller 144.

Computer system 100 also includes a communications adaptor 150 which allows the system to be interconnected to a local area network (LAN) or a wide area network (WAN), schematically illustrated by bus 152 and network 154. Thus, data and computer program software can be transferred to and from computer system 100 via adapter 150, bus 152 and network 154.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

One of ordinary skill in the art will realize further features and advantages of the invention from the above-described embodiments. Accordingly, the invention is not to be limited by what has been particularly shown and described, except as indicated by the appended claims. All references cited herein are expressly incorporated by reference in their entirety.

APPENDIX

```
searchlib.pl
#!/usr/local/bin/perl

$top = "/usrllocal/weblib/tpigroup/online";
$stemmer = "$top/bin/stemmer";
$debug = 0;
sub gen_criteria {
```

APPENDIX-continued

```perl
   local ($them_table, *q, $me_table, $user_id, $all_criteria) = @_;
   my $where, $i, $k, @keywords;
   if ($them_table ne '') {
      $them_table = "$them_table.";
   }
   if ($me_table ne '') {
      $me_table = "$me table.";
   }
   if ($debug) {
      foreach $i (keys %q) {
         print "$i: ", $q{$i}, "<br>\n";
      }
   }
   # don't do this if automatch
   if ($q{'to_sex'}ne '') {
      $where .= "and ${them_table}sex = '$q{to_sex}'";
   }
if($all_criteria)
{
   if ($q{'age#min'}) {
      $where .= "and ${them_table}age >= $q{age#min}";
   }
   if ($q{'age#max'}) {
      $where .= "and ${them_table}age <= $q{age_max}";
   }
# reverse (need to add more reverse stuff)
   if($q{'age'}) {
      $where .= "and ${them_table}age_min <= $q{age} and ${them#table}age_max >= $q{age}";
   }
   if ($q{'ethno_pref'}ne ''&& $q{'ethno_ref'} ne 'X') {
      $where .= "and ${them_table}ethno = '$q{ethno_pref}'";
   }
   if ($q{'ethno'} ne '' && $q{'ethno'} ne 'X') {
      $where .= "and (${them#table}ethno_ref = '$q{ethno}' or ${them#table}ethno_ref is null) ";
   }
   if($q{'height#min'} ne '') {
      $where .= "and (${them_table}height >= '$q{'height_min'}' or ${them_table}height IS NULL) ";
   }
   if ($q{'height_max'}ne '') {
      $where = "and (${them_table}height <= '$q{'height_max'}' or ${them_table}height IS NULL) ";
   }
   if ($q{'height'}ne '') {
      $where .= "and (${them_table}height_min <= '$q{'height'}' or ${them_table}height_min IS NULL) ";
      $where .= "and (${them_table}height_max >= '$q{'height'}' or ${them_table}height_max IS NULL) ";
   }
   if ($q{'body#type#ref'} ne ''&& $q{'body_type#ref'}ne 'X') {
      $where .= "and ${them_table}body_type = '$q{body_type_ref}'";
   }
   if ($q{'body_type'} ne ''&& $q{'body_type'} ne 'X') {
      $where .= "and (${them_table}body_type_ref = '$q{body_type}' or ${them_table}body_type_pref is null) ";
   }
   if ($q{'smoking_pref'}) {
      $where .= "and ${them_table}smoking = $q{smoking_pref}";
   }
   if ($q{'smoking'}) {
      $where .= "and (${them_table}smoking_pref = $q{smoking} or ${them_table}smoking_pref is null) ";
   }
   if ($q{'drinking_pref'}) {
      $where .= "and ${them_table}drinking = $q{drinking_pref} ";
   }
   if ($q{'drinking'}) {
      $where .= "and (${them_table}drinking_pref = $q{drinking} or ${them_table}drinking_pref is null) ";
   }
   if ($q{'education_pref'}) {
      $where .= "and ${them_table}education >= $q{education_pref} ";
   }
   if($q{'education'}) {
      $where = "and (${them_table}education_pref <= $q{education} or ${them_table}education_pref is null) ";
   }
```

APPENDIX-continued

```perl
    if ($q{'religion_pref'} ne '' && $q{'religion_pref'} ne 'X') {
        $where .= "and ${them_table}religion = '$q{religion_pref}'";
    }
    if($q{'religion'} ne "&& $q{'religion'} ne 'X') {
        $where .= "and (${them_table}religion_pref = '$q{religion}' or
${them_table}religion_pref is null) ";
    }
    if ($q{'children_pref'} ne "&& $q{'children_pref'} ne 'X') {
        $where .= "and ${them_table}children = '$q{children_pref}'";
    }
    if ($q{'children'} ne "&& $q{'children'} ne 'X') {
        $where .= "and (${them_table}children_pref = '$q{children}' or
${them_table}children_pref is null) ";
    }
    #here we create a box surrounding the distance circle, contacting points on
    #the circle east, west, north, south
    #a cheap and decent approximation
    if (($q{'distance_pref'} ne '') && ($q{'latitude'} ne '') &&
($q{'longitude'} ne '')) {
        $miles_per_lat = 68.9754;
        $pi = 3.14159265358979;
        $miles_per_lon = 68.9754 * cos($pi*$q{'latitude'}/180);
        $diff_lat = $q{'distance_pref'} /$miles_per_lat;
        $diff_lon = $q{'distance_pref'} /$miles_per_lon;
        $westlat = $q{'latitude'};
        $westlon = $q{'longitude'} - $diff_lon;
        $northlat = $q{'latitude'} + $diff_lat;
        $northlon = $q{'longitude'};
        $eastlat = $q{'latitude'};
        $eastlon = $q{'longitude'} + $diff_lon;
        $southlat = $q{'latitude'} - $diff_lat;
        $southlon = $q{'longitude'};
        $where .= "and (${them_table}latitude > $southlat) and
(${them_table}latitude < $northlat) and (${them_table}longitude > $westlon)
and (${them_table}longitude < $eastlon) ";
    }
    if (($q{'location_pref'} ne '') && ($q{'latitude'} ne '') &&
($q{'longitude'} ne '')) {
        $miles_per_lat = 68.9754;
        $pi = 3.14159265358979;
        $miles_per_lon = 68.9754 * cos($pi*$q{'latitude'}/180);
        $diff_lat = $q{'location_pref'} /$miles_per_lat;
        $diff_lon = $q{'location_pref'} /$miles_per_lon;
        $westlat = $q{'latitude'};
        $westlon = $q{'longitude'} - $diff_lon;
        $northlat = $q{'latitude'} + $diff_lat;
        $northlon = $q{'longitude'};
        $eastlat = $q{'latitude'};
        $eastlon = $q{'longitude'} + $diff_lon;
        $southlat = $q{'latitude'} - $diff_lat;
        $southlon = $q{'longitude'};
        $where .= "and (${them_table}latitude > $southlat) and
(${them_table}latitude < $northlat) and (${them_table}longitude > $westlon)
and (${them_table}longitude < $eastlon) ";
#       $where .= "and ($q{'latitude'} > ${them_table}latitude -
(${them_table}location_pref/$miles_per_lat)) and ($q{'latitude'} <
${them_table}latitude + (${them_table}location_pref/$miles_per_lat)) and
($q{'longitude'} > ${them_table}longitude - (${them_table}location_pref/
($miles_per_lat * cos($pi * ${them_table}latitude/180)))) and
($q{'longitude'} < $ {them_table}longitude + (${them_table}location_pref/
($miles_per_lat * cos($pi * ${them_table}latitude/180)))) ";
    }
    if ($q{'member_cat'} = ~/Internet/) {
        $where .= "and ${them_table}internet = 'Y'";
    }
    if ($q{'member_cat'} = ~/Newspaper/) {
        $where .= "and ${them_table}internet = 'N'";
    }
    if ($q{'keyedwords'} ne '') {
        $tmp = "$$.tmp";
        open (TMP, ">/tmpl$$.tmp") ||warn "match: cant open tmp file: $!";
        print TMP "$q{'keyedwords'}\n";
        close TMP;
#       print "current directory: ", 'pwd', "<br>\n";
        $k = '$stemmer < /tmpl$$.tmp';
        unlink("/tmp/$$.tmp");
#       print "stemmed: $k<br>\n";
        @keywords = split (/,/,$k);
        $where .= "and (upper(${them_table}body) like upper('%".
```

APPENDIX-continued

```perl
$keywords[0]. "%')";
    for ($i = 1; $i < @ keywords; $i++) {
      $where .= "or ${them_table}body like '%". $keywords[$i]. "%'";
    }
    $where .= ")";
  }
}# end if all_criteria
   return $where;
}
1;
automatch.pl
#!/usr/local/bin/perl

require "/usr/local/weblib/tpigroup/online/pl/config.pl";
require "$TOUCHE_ROOT/lib/searchlib.pl";
$debug = 0;
@fields = ('sex', 'age_min', 'age_max', 'age', 'ethno_ref', 'ethno',
           'body_type_pref', 'body_type', 'smoking_pref', 'smoking',
           'drinking_pref', 'drinking', 'education_pref', 'education',
           'religion_pref', 'religion', 'children_pref', 'children');
sub automatch {
   my ($user) = @_;
   my $sql = "select" .join(', ', @fields). "from wp_user where user_id = '$user'";
   my $cursor = $dbh -> prepare ($sql);
   if ($cursor eq undef) {
      print "<H3>Message: ", $dbh -> errstr, "</H3>\n";
      exit;
   }
   $cursor -> execute;
   my @row = $cursor -> fetchrow;
   $cursor -> finish;
   for ($i = 0; $i < @row; $i++) {
      $q{$fields[$i]} = $row[$i];
   }
   $sql = "
insert into wp_journal
(select
usr_from.user_id,
usr_to.user_id,
SYSDATE,
NULL,
NULL,
NULL,
NULL,
'This journal entry brought to you by the Automatcher.',
'N',
'A',
from
wp_user usr_from,
wp_user usr_to,
wp_seeking seek_from,
wp_seeking seek_to
where
usr_from.user_id = seek_from.user id and
seek_to.user id = usr to.user id and
seek_from.seek_gender = usr_to.sex and
seek_to.seek_gender = usr_from.sex and
seek_to.seek_for = seek_from.seek_for and
usr_from.user_id = '$user' and
usr_to.user_id not in (select journal_id from wp_journal where user_id = '$user') ";
   $sq1 .= &gen_criteria ("usr_to", *q);
   $sq1 .= ")";
   $sq1 =~ s/\n//gm;
   print $sq1, "\n" if $debug;
   $rc = $dbh -> do($sq1);
   if ($dbh -> errstr ne "")
   {
        print "error: ", $dbh -> errstr, "\n";
   }
   $dbh -> commit;
   print "rc = $rc\n" if $debug;
   if($rc =~/^[0-9]/) {
      return $rc;
   }
   return 0;
}
```

What is claimed is: 1. In a system for matching user information comprising a networked computer system, a plurality of publishers, and a plurality of users, a method of matching a first user of a system with at least one other user of the system, comprising the steps of:

soliciting characteristic and criteria data from a plurality of users by a plurality of publishers;

storing the characteristic and criteria data of the users of the system on the networked computer system, the characteristic data including an identity of the publisher that solicited a particular user's data and establishing an affiliation between the user and the publisher who solicited the user's data;

providing publishers with a means for blocking matches between users affiliated with the publisher and users affiliated with selected other publishers;

comparing the criteria data of a first user with the characteristic data of at least one other user of the system;

comparing the criteria data of the at least one other user with the characteristic data of the first user;

providing information associated with the at least one other user to the first user for the case where at least some of the characteristic data of the at least one other user matches the criteria data of the first user, and at least some of the characteristic data of the first user matches the criteria data of the at least one other user, wherein the publisher affiliation of the at least one user can form a basis to prevent the information associated with the at least one other user from being provided to the first user.

2. The method according to claim 1, wherein the characteristic data of the first user includes age data.

3. The method according to claim 1, wherein the criteria data of the first user includes a desired range of ages with respect to the at least one other user.

4. The method according to claim 1, wherein at least one of the characteristic data elements of the first user is selected from the group consisting of age, gender, ethnicity, religion, parental status, smoking status, drinking status, body type, education level, height, and geographic location.

5. The method according to claim 1, wherein at least one of the criteria data of the first user is selected from the group consisting of age range, gender, ethnicity, religion, parental status, smoking status, drinking status, body type, education level, height, and geographic location.

6. The method according to claim 1, wherein the step of soliciting the characteristic and criteria data includes communicating over the Internet.

7. The method according to claim 1, wherein at least one of the publishers is a newspaper publisher.

8. The method according to claim 1, wherein the at least one other user includes a plurality of other users and the information associated with the plurality of other users is provided in an order according to a parameter.

9. The method according to claim 8, wherein the parameter is selected from the group consisting of e-mail capability, voice-greeting status, on-line personal ad status, system identification number, geographical closeness, closeness in age, astrological closeness, response level to personal ad, client, number of users in personal journal, likelihood of responding to an e-mail, most recent system interaction, number of system stamps.

10. The method according to claim 8, wherein the parameter according to which the at least one other users are ordered is the publisher identifier.

11. A system for matching a first user with at least one other of a plurality of users of the system wherein a plurality of the users have an affiliation with one of a plurality of publishers, comprising:

an interface for obtaining characteristic and criteria data for users of the system, the characteristic data including a publisher identifier representing a user's publisher affiliation;

a memory for storing the characteristic and criteria data of users of the system including the first user and the at least one other user;

a comparator for comparing the criteria data of the first user with characteristic data of the at least one other user and comparing the criteria data of the at least one other user with the characteristic data of the first user;

a communication device for providing information associated with the at least one other user to the first user for the case where at least some of the criteria data of the first user matches the characteristic data of the at least one other user and at least some of the criteria data of the at least one other user substantially matches the characteristic data of the first user; and a publisher criteria device for accepting publisher criteria data to form a basis for preventing the information associated with the at least one other user from being provided to the first user.

12. The system according to claim 11, further including an ordering device for providing the information associated with the at least one other user in an order based on a parameter.

13. The system according to claim 12, wherein the parameter is selected from the group consisting of e-mail capability, voice-greeting status, on-line personal ad status, system identification number, geographical closeness, closeness in age, astrological closeness, response level to personal ad, client, number of users in personal journal, likelihood of responding to an e-mail, most recent system interaction, number of system stamps.

14. The system according to claim 11, wherein the interface includes a connection over the Internet.

15. The system according to claim 11, wherein the memory includes a database storing the characteristic or criteria data in the form of a data string.

16. The system according to claim 11, wherein the comparator forms a data string based on the characteristic and criteria data of the first user and the at least one other user for searching a user database.

17. The method according to claim 11, wherein the publisher criteria device includes means for preventing matches by allowing publishers to select characteristic or criteria data categories that do not match characteristic or criteria data categories selected by other publishers.

18. In a system for matching a first user with at least one other of a plurality of users of the system wherein a plurality of the users have an affiliation with one of a plurality of publishers, a computer program product, comprising:

a computer usable medium having computer readable code to obtain characteristic and criteria data from users of the system, the characteristic data including a publisher identifier representing a user's publisher affiliation;

a computer usable medium having computer readable code to store the characteristic and criteria data of the users of the system;

a computer usable medium having computer readable code to compare the criteria data of a first user with the characteristic data of at least one other user of the system;

a computer usable medium having computer readable code to compare the criteria data of the at least one other user with the characteristic data of the first user;

a computer usable medium having computer readable code to provide information associated with the at least one other user to the first user for the case where at least some of the characteristic data of the at least one other user matches the criteria data of the first user, and at least some of the characteristic data of the first user matches the criteria data of the at least one other user; and a computer usable medium having computer readable code to accept publisher criteria data, the publisher criteria data forming a basis for preventing the information associated with the at least one other user from being provided to the first user.

19. The computer program product according to claim 18, further comprising a computer usable medium having computer readable code to order the information associated with the at least one other user according to a parameter.

20. The computer program product according to claim 18, wherein the computer usable medium has computer readable code that obtains characteristic and criteria data over the Internet.

21. In a system for matching user information comprising a networked computer system, a plurality of publishers, and a plurality of users, a method of matching a first user of a system with at least one other user of the system, comprising the steps of:

soliciting characteristic data from a plurality of users by a plurality of publishers;

storing the characteristic data of the users of the system on the networked computer system, the characteristic data including an identity of the publisher that solicited a particular user's data and establishing an affiliation between the user and the publisher who solicited the user's data;

accepting criteria data from a first user having a publisher affiliation;

storing the criteria data from the first user and an identity of the publisher affiliated with the first user on the networked computer system;

comparing the criteria data and affiliated publisher identity of the first user with the characteristic data and affiliate d publisher identity of at least one other user of the system;

providing publishers with a means for blocking matches between users affiliated with the publisher and users affiliated with selected other publishers;

providing information associated with the at least one other user to the first user for the case where at least some of the characteristic data of the at least one other user matches the criteria data of the first user, and at least some of the characteristic data of the first user matches the criteria data of the at least one other user, wherein the publisher affiliation of the at least one user can form a basis to prevent the information associated with the at least one other user from being provided to the first user.

22. The method according to claim 21, wherein the step of soliciting the characteristic data includes communicating over the Internet.

23. The method according to claim 21, wherein the step of obtaining the criteria data includes communicating over the Internet.

24. The method according to claim 21, wherein at least one of the publishers is a newspaper publisher.

25. The method according to claim 24, wherein at least one of the publishers is a Web-site.

26. The method according to claim 21, wherein at least one of the publishers is a Web-site.

27. The method according to claim 21, wherein the at least one other user includes a plurality of other users and the information associated with the plurality of other users is provided in an order according to a parameter.

28. The method according to claim 27, wherein the parameter is selected from the group consisting of e-mail capability, voice-greeting status, on-line ad status, system identification number, geographical closeness, closeness in age, astrological closeness, response level to personal ad, publisher identity, and likelihood of responding to an e-mail, most recent system interaction.

29. The method according to claim 27, wherein the parameter according to which the at least one other users are ordered is the publisher identity.

30. A system for providing information to a searching user from at least one of a plurality of advertising users of the system wherein a plurality of the advertising users have an affiliation with one of a plurality of publishers, comprising:

a first interface for obtaining characteristic data and information for advertising users of the system, the characteristic data including a publisher identifier representing an advertising user's publisher affiliation;

a second interface for obtaining criteria data from a searching user of the system, the searching user being affiliated with a publisher;

a memory for storing the characteristic data, information and publisher identity of advertising users of the system and criteria data and publisher identity for the searching user;

a comparator for comparing the criteria data of the first user with characteristic data of a plurality of advertising users;

a communication device for providing information associated at least one advertising user to the searching user for the case where at least some of the criteria data of the searching user substantially matches the characteristic data of the at least one advertising user; and a publisher criteria device for accepting publisher criteria data to form a basis for preventing the information associated with the at least one advertising user from being provided to the searching user based on the publisher identity of the searching user and the at least one advertising user.

31. The system according to claim 30, further including ordering means for providing the information associated with the at least advertising user in an order based on a parameter.

32. The system according to claim 31, wherein the parameter is selected from the group consisting of e-mail capability, voice-greeting status, on-line ad status, system identification number, geographical closeness, closeness in age, astrological closeness, response level to ad, client, number of users in personal journal, likelihood of responding to an e-mail, most recent system interaction, and publisher identity.

33. The system according to claim 31, wherein the parameter according to which the at least one advertising user is ordered is the publisher identity.

34. The system according to claim 30, wherein the first interface means includes a connection over the Internet.

35. The system according to claim 30, wherein the second interface means includes a connection over the Internet.

36. The system according to claim 30, wherein the memory includes a database allowing storage of the characteristic data in the form of a data string.

37. The system according to claim 30, wherein the comparitor forms a data string based on the criteria data of a searching user for searching a user database.

38. The system according to claim 30, wherein at least one of the publishers is a newspaper publisher.

39. The method according to claim 38, wherein at least one of the publishers is a Web-site.

40. The method according to claim 30, wherein at least one of the publishers is a Web-site.

41. The method according to claim 30, wherein the publisher criteria device includes means for preventing matches by allowing publishers to select characteristic or criteria data categories that do not match characteristic or criteria data categories selected by other publishers.

* * * * *